United States Patent
Holt et al.

(10) Patent No.: US 7,519,987 B1
(45) Date of Patent: Apr. 14, 2009

(54) METHOD, SYSTEM, AND APPARATUS TO ALLOW FOR CREDENTIAL VAULT USAGE IN TEMPLATED PORTAL APPLICATIONS

(75) Inventors: Robert Douglas Holt, Raleigh, NC (US); Jason Allan Nikolai, Rochester, MN (US); Joseph William Cropper, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/026,025

(22) Filed: Feb. 5, 2008

(51) Int. Cl.
| | |
|---|---|
| G06F 7/04 | (2006.01) |
| G06F 17/30 | (2006.01) |
| G06F 7/58 | (2006.01) |
| G06F 11/00 | (2006.01) |
| G06F 15/177 | (2006.01) |
| G06F 12/16 | (2006.01) |
| G06K 9/00 | (2006.01) |
| G06K 19/00 | (2006.01) |
| H04L 9/32 | (2006.01) |
| G06F 3/00 | (2006.01) |
| G06F 7/00 | (2006.01) |
| G06F 15/16 | (2006.01) |
| G06F 15/173 | (2006.01) |

(52) U.S. Cl. ............... 726/2; 726/4; 726/22; 726/23; 726/24; 726/25; 726/26; 709/208; 709/224; 715/760; 715/762; 715/733; 707/3; 707/102

(58) Field of Classification Search ............... 726/4–6, 726/8, 20–26; 709/220, 224, 208; 715/733, 715/760, 762; 707/3, 102
See application file for complete search history.

(56) References Cited

U.S. PATENT DOCUMENTS

| | | |
|---|---|---|
| 2003/0110448 A1 | 6/2003 | Haut et al. |
| 2004/0010598 A1 | 1/2004 | Bales et al. |
| 2005/0114701 A1* | 5/2005 | Atkins et al. ................ 713/201 |
| 2005/0144232 A1 | 6/2005 | Estrada et al. |
| 2005/0177815 A1 | 8/2005 | Kurz et al. |
| 2006/0085520 A1* | 4/2006 | Allamaraju et al. ......... 709/218 |
| 2006/0129935 A1* | 6/2006 | Deinlein et al. ............. 715/733 |
| 2006/0235935 A1* | 10/2006 | Ng .............................. 709/208 |
| 2007/0067265 A1* | 3/2007 | Husfelt et al. .................. 707/3 |
| 2007/0124688 A1* | 5/2007 | Nauerz et al. ............... 715/746 |
| 2007/0209011 A1* | 9/2007 | Padmanabhuni et al. .... 715/762 |
| 2007/0283281 A1* | 12/2007 | Ainsworth et al. .......... 715/760 |

FOREIGN PATENT DOCUMENTS

EP   1638022 A2   3/2006

* cited by examiner

Primary Examiner—Shin-Hon Chen
(74) Attorney, Agent, or Firm—MaxValueIP, LLC

(57) ABSTRACT

One example creates an application specific credential vault manager for templated applications. This credential vault manager would be associated with the portlets requiring the use of the credential vault and allow the user to configure the credential vault access at a composite application scope instead of at the portlet scope or the portlet application scope.

1 Claim, 3 Drawing Sheets

METHOD, SYSTEM, AND APPARATUS TO ALLOW FOR CREDENTIAL VAULT USAGE IN TEMPLATED PORTAL APPLICATIONS

BACKGROUND OF THE INVENTION

Portal-based products implement a security component that manages authentication and authorization to resources within the Portal environment. Portal applications usually require access to backend applications and need additional authentication to resources beyond those under the control of the Portal server. When additional access is required several techniques can be used such SSO (single sign on), EIM (Enterprise Identity Mapping), or a credential vault. Credential Vault holds credential information and allows portlets to access the credentials to provide single sign-on authentication. Credential Vault allows you to add and manage vault segments and resources as well as managing system and user vault slot. You can create a vault slot for each known application in the portal that requires access to secure resources. The credential vault is a popular way of storing and gaining access to sensitive information (user ID and password) that will allow access to external resources, such as a back end system.

Each portlet must be written to manage and control its credential vault information. This presents a limitation on ease of use when trying to take advantage of a templated application design. For instance, if there is a templated application which consist of 10 portlets with each portlet requiring the use of a credential vault entry, the user must configure each portlet to use the credential vault segment resulting in 10 updates each time the application is instantiated. This invention address the issue of using the credential vault for templated applications such that the credential vault configuration need only be done once during the time the application is instantiated.

SUMMARY OF THE INVENTION

One embodiment creates an application specific credential vault manager for templated applications. This credential vault manager would be associated with the portlets requiring the use of the credential vault and allow the user to configure the credential vault access at a composite application scope instead of at the portlet scope or the portlet application scope. This means that portlets developed by different vendors could be included in a single application from the user's perspective while simplifying the credential vault management.

DETAILED DESCRIPTION OF THE PREFERRED EMBODIMENTS

The Credential Vault is a portlet service that helps portlets and portal users manage multiple identities. This is a persistent store where credentials are actually stored. The Credential Vault stores credentials that allow portlets to log in to applications outside the portal realm on behalf of the user. While Active Credentials allow you to establish connections via Basic Authentication, Lightweight Third Party Authentication (LTPA) token authentication or simple form-based user ID/password login challenges, Passive Credentials allow the retrieval of stored secrets such as, but not limited to, userid and password or certificates. On the portlet level, there maybe systems that require explicit login. To facilitate the storage, retrieval and usage of the credentials necessary to access these back-end systems, credential vault services can be used. The system allows the user to easily and securely persist user IDs and passwords without concerning the user with database access codes.

Figure 1:
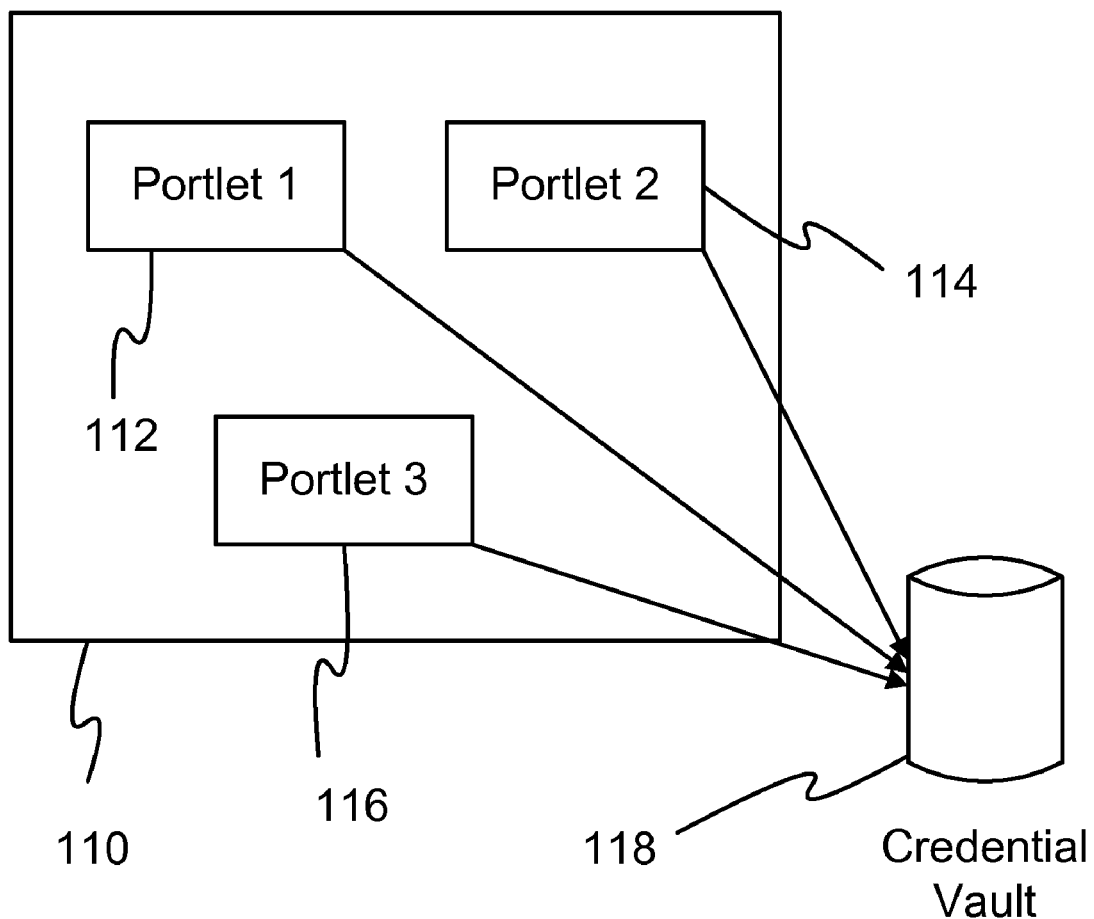
FIG. 1 is a schematic diagram of each portlet that are configured to access credential vault

FIG. 1 shows that each portlet (112, 114, 116, 110) must be configured to access the credential vault (118).

Figure 2:
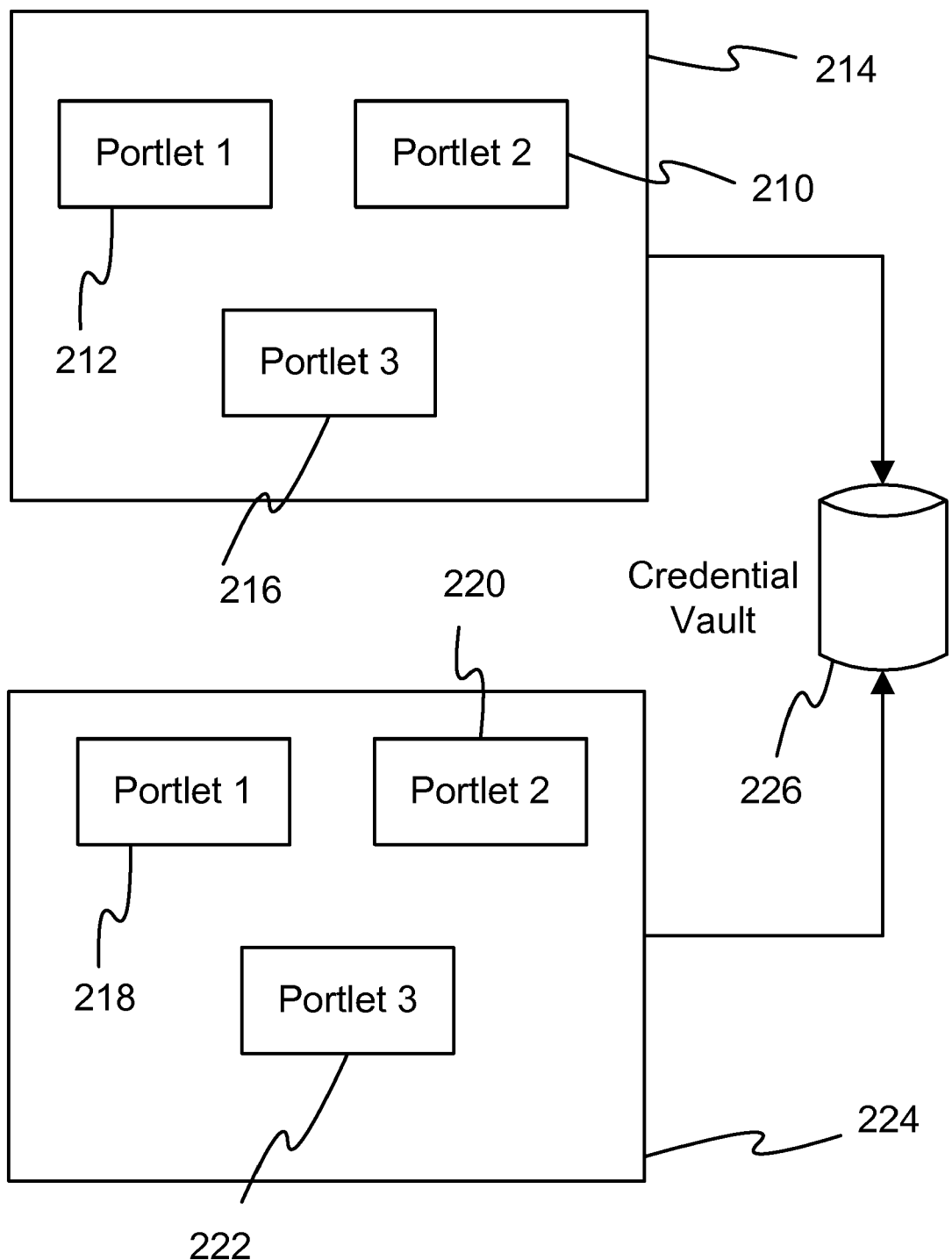
FIG. 2 is a schematic diagram of the aggregation of separate portlets into a single application

FIG. 2 shows an application template that consists of multiple portlets (210, 212, 216, 218, 220, 222, 214, 224) from the same or separate portlet applications. The template aggregates independent portlets into a logical application and the credential vault (226) manager (represented by the vertical bar) allows the user to set the credential vault configuration once for all the portlet applications to use instead of having to configure each portlet.

Figure 3:
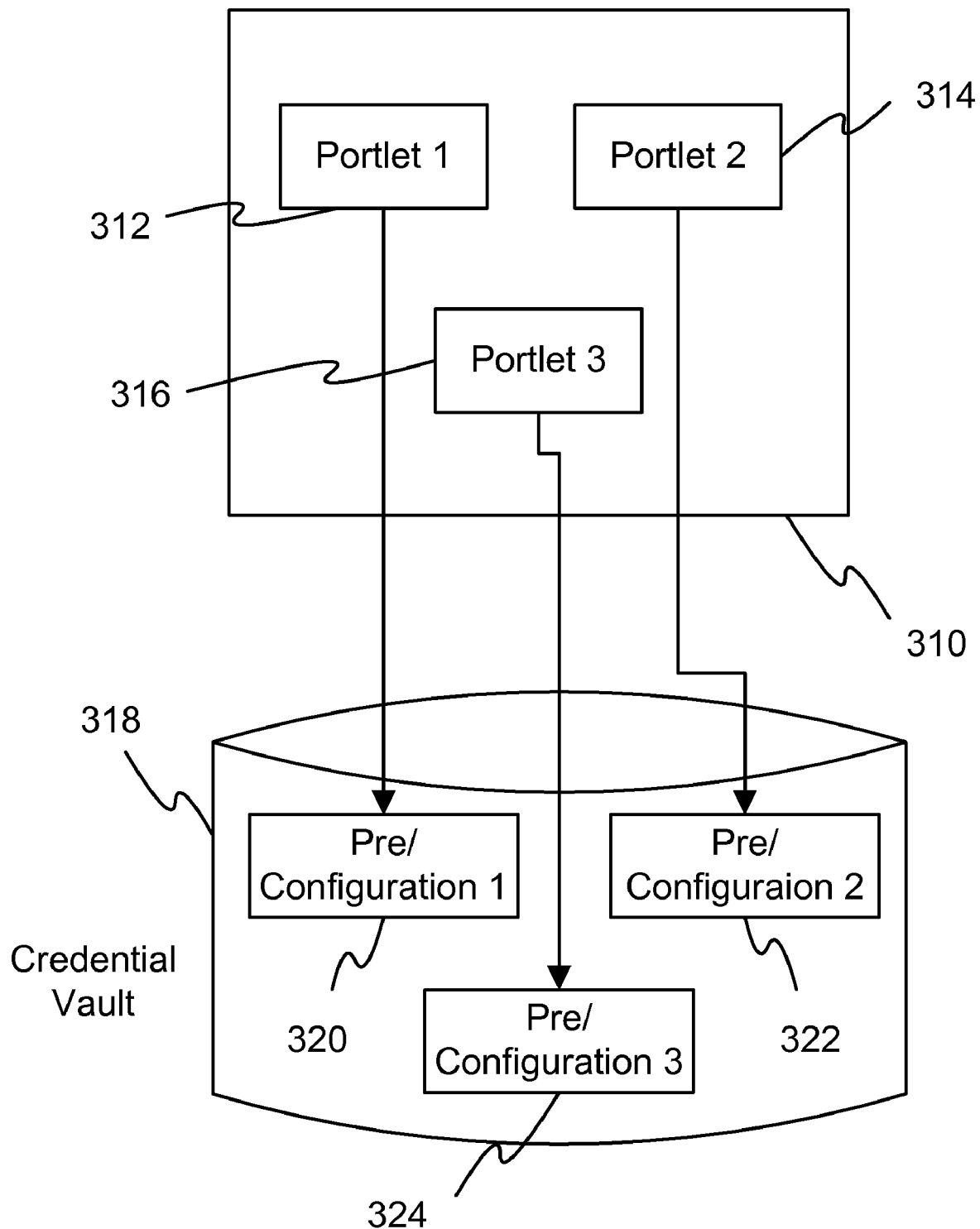
FIG. 3 is a schematic diagram of all portlets that share credential vault configuration

FIG. 3 shows actual applications instantiated off of the application template shown in previous figure where all portlets (310, 312, 314, 316) share the credential vault configuration for the composite application. (320, 322, 324, 318)

Each of the application within the portlet is associated with a pre-configuration segment within the credential vault. The pre-configuration segment within the credential vault is associated with the application though a similar configuration within the application's template. This will allow the user to have a seamless transition from one application to the next.

Below is an embodiment of the present invention: A method to allow for credential vault usage in a templated portal application is presented, as an example, wherein the method comprises:

a portal-based product implementing a security component;

the security component managing authentication and authorization to resources within the portal environment;

wherein the security component comprising a credential vault;

wherein multiple portlets are configured to access the credential vault;

wherein the multiple portlets are hosted in the portal;

using the credential vault for the templated portal application;

a credential vault manager associating with the multiple portlets;

during each instantiation of the templated portal application, configuring the credential vault only once;

the credential vault manager allowing a user to configure the credential vault access at a composite application scope, for one or more portlet applications;

wherein a template corresponding to the templated portal application comprising the multiple portlets, from the one or more portlet applications;

the template aggregating the multiple portlets into a logical application;

the credential vault manager associating with the logical application;

each of the multiple portlets associating with one of credential vault configuration types;

wherein each of credential vault configurations comprising a pre-configured portion and a dynamically-configured portion;

wherein the pre-configured portion is associated with one of the credential vault configuration types;

wherein the pre-configured portion is defined in the template;

instantiating the one or more portlet applications, using the template, so that a first plurality of portlets associated with the same credential vault configuration type share one credential vault configuration which has its pre-configured portion associated with the same credential vault configuration type as that of the first plurality of portlets; and the credential vault manager accessing credentials at the credential vault, based on the credential vault configuration, to allow the multiple portlets access the resources within the portal environment.

A system, apparatus, or device comprising one of the following items is an example of the invention: credential vault, portals, portlets, authentication module, encryption module, secure environment, private network, secure network, ID document, biometrics module, email server, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of ID, security, authentication, e-commerce, and transaction management.

Any variations of the above teaching are also intended to be covered by this patent application.

The invention claimed is:

1. A method to allow for credential vault usage in a portal, said method comprising:

a portal-based product implementing a security component for said portal running on a portal server;

said security component managing authentication and authorization to resources within said portal;

wherein said security component comprising a credential vault;

wherein multiple portlets are configured to access said credential vault;

wherein said multiple portlets are hosted in said portal;

using said credential vault for a templated portal application;

a credential vault manager associating with said multiple portlets;

during each instantiation of said templated portal application, configuring said credential vault only once;

said credential vault manager allowing a user to configure said credential vault access at a composite application scope, for one or more portlet applications;

wherein a template corresponding to said templated portal application comprising said multiple portlets, from said one or more portlet applications;

said template aggregating said multiple portlets into a logical application;

said credential vault manager associating with said logical application;

each of said multiple portlets associating with one of credential vault configuration types;

wherein a pre-configured portion of each of credential vault configurations is associated with one of said credential vault configuration types;

wherein said pre-configured portion is defined in said template;

instantiating said one or more portlet applications, using said template, so that a first plurality of portlets associated with the same credential vault configuration type share one credential vault configuration which has its pre-configured portion associated with the same credential vault configuration type as that of said first plurality of portlets;

wherein said pre-configured portion corresponding to each of said first plurality of portlets is stored separately in said credential vault and only shared for said first plurality of portlets; and said credential vault manager accessing credentials at said credential vault, based on said credential vault configuration, to allow said multiple portlets access said resources within said portal environment.

* * * * *